US010179514B2

(12) United States Patent
Murata et al.

(10) Patent No.: US 10,179,514 B2
(45) Date of Patent: Jan. 15, 2019

(54) BATTERY CHARGING SYSTEM AND BATTERY CHARGING METHOD FOR ELECTRICALLY DRIVEN VEHICLE

(71) Applicant: Toyota Jidosha Kabushiki Kaisha, Toyota-shi, Aichi-ken (JP)

(72) Inventors: Takashi Murata, Kasugai (JP); Yusuke Kuruma, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 8 days.

(21) Appl. No.: 15/634,653

(22) Filed: Jun. 27, 2017

(65) Prior Publication Data

US 2018/0001774 A1 Jan. 4, 2018

(30) Foreign Application Priority Data

Jul. 4, 2016 (JP) .................................. 2016-132181

(51) Int. Cl.

| B60L 11/18 | (2006.01) |
|---|---|
| H02J 7/00 | (2006.01) |
| B60L 1/02 | (2006.01) |
| H02J 7/04 | (2006.01) |

(Continued)

(52) U.S. Cl.
CPC ............. B60L 11/1809 (2013.01); B60L 1/02 (2013.01); B60L 11/1816 (2013.01); B60L 11/1861 (2013.01); B60L 11/1875 (2013.01); H01M 10/615 (2015.04); H01M 10/625 (2015.04); H02J 7/007 (2013.01); H02J 7/0021 (2013.01); H02J 7/0045 (2013.01);

*H02J 7/042* (2013.01); *B60L 2240/545* (2013.01); *Y02T 10/7005* (2013.01); *Y02T 10/705* (2013.01);

(Continued)

(58) Field of Classification Search
CPC .................................................... B60L 11/1809
See application file for complete search history.

(56) References Cited

U.S. PATENT DOCUMENTS

| 5,986,430 A * | 11/1999 | Fernandez | ............ | H02J 7/0004 |
| | | | | 320/106 |
| 2001/0035733 A1 * | 11/2001 | Murphy | ................ | H02J 7/0075 |
| | | | | 320/107 |

(Continued)

FOREIGN PATENT DOCUMENTS

| EP | 2685599 A1 | 1/2014 |
| EP | 3037300 A2 | 6/2016 |

(Continued)

*Primary Examiner* — Suresh Memula
(74) *Attorney, Agent, or Firm* — Dinsmore & Shohl LLP

(57) ABSTRACT

In a case where an external charging start time is set in an external charging timer when a charging plug is connected to a charging connector, a charging controller is configured to perform standby setting of external charging before the external charging start time and transits to a pause state. The charging controller is intermittently activated during a timer charging setting period from a pause period start time when transition is made to the pause state to the external charging start time, and when a battery temperature at the time of activation of the charging controller is equal to or lower than a predetermined temperature, execute a temperature increase mode in which a heater is operated to increase the temperature of a main battery.

9 Claims, 7 Drawing Sheets

(51) Int. Cl.
*H01M 10/625* (2014.01)
*H01M 10/615* (2014.01)

(52) U.S. Cl.
CPC ........ *Y02T 10/7044* (2013.01); *Y02T 10/7072* (2013.01); *Y02T 10/92* (2013.01); *Y02T 90/14* (2013.01)

(56) References Cited

U.S. PATENT DOCUMENTS

| | | | | |
|---|---|---|---|---|
| 2012/0176082 A1* | 7/2012 | Lee | ............................ | B60L 1/02 320/103 |
| 2012/0318783 A1 | 12/2012 | Kamachi | | |
| 2013/0162027 A1 | 6/2013 | Yamamoto et al. | | |
| 2014/0021918 A1 | 1/2014 | Ichikawa et al. | | |
| 2016/0126760 A1* | 5/2016 | Murata | ................... | H02J 7/007 320/107 |
| 2016/0181835 A1* | 6/2016 | Gross | ................... | H02J 7/0013 320/101 |
| 2016/0190661 A1 | 6/2016 | Kuruma et al. | | |

FOREIGN PATENT DOCUMENTS

| | | |
|---|---|---|
| JP | 2012-055115 A | 3/2012 |
| JP | 2012-143026 A | 7/2012 |
| JP | 2012-191781 A | 10/2012 |
| JP | 2012-209213 A | 10/2012 |
| JP | 2016-122529 A | 7/2016 |

\* cited by examiner

FIG. 2

|  | SECOND TEMPERATURE INCREASE MODE | FIRST TEMPERATURE INCREASE MODE |
|---|---|---|
| BATTERY TEMPERATURE Tb | Tb ≦ A2 | A2 < Tb ≦ A1 |
| TEMPERATURE INCREASE TARGET TEMPERATURE B | B2 | B1 |
| STANDBY TIME UNTIL NEXT ACTIVATION | C2 | C1 |
| TEMPERATURE INCREASABLE PERIOD | D2 | D1 |

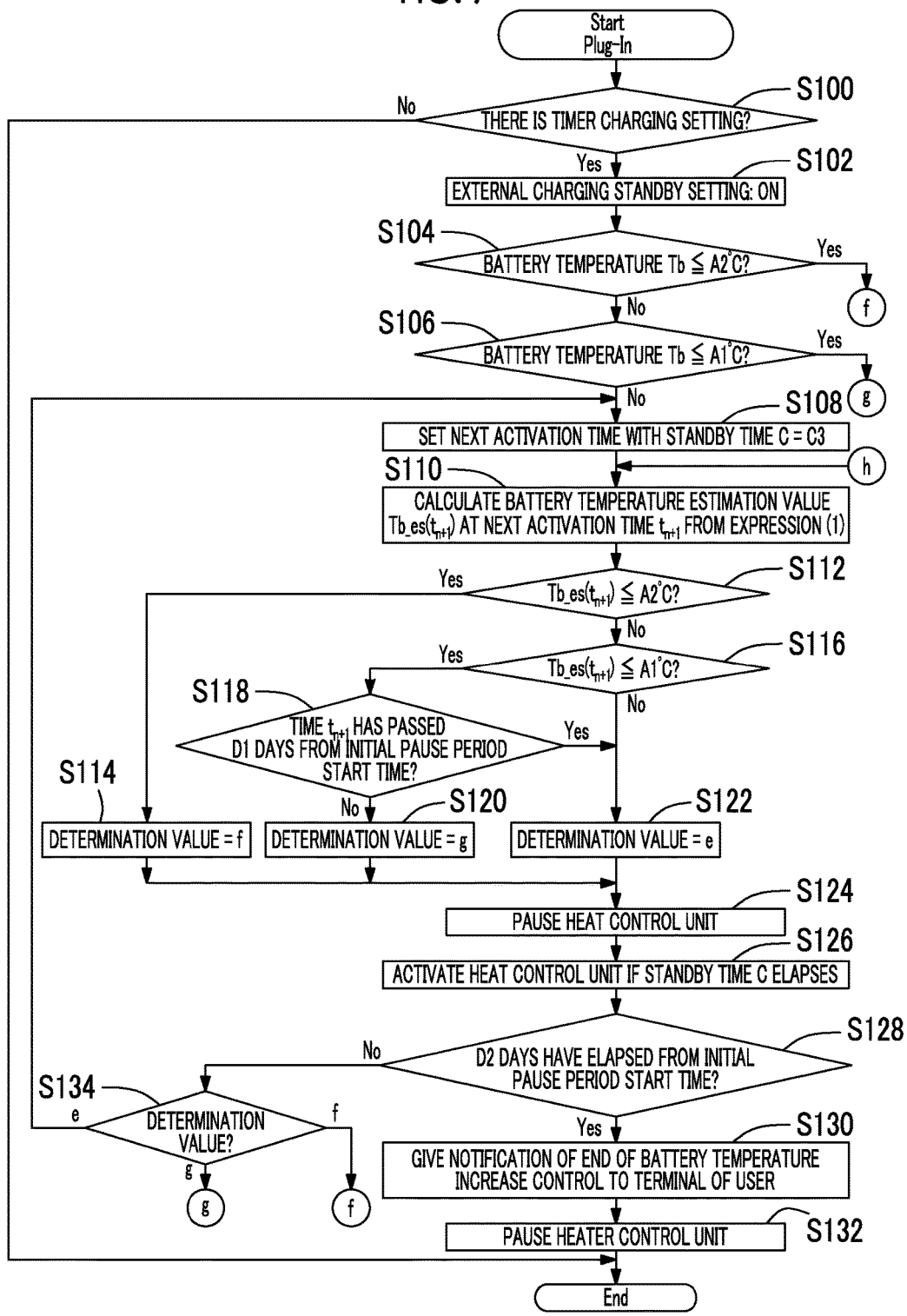

BATTERY CHARGING SYSTEM AND BATTERY CHARGING METHOD FOR ELECTRICALLY DRIVEN VEHICLE

CROSS-REFERENCE TO RELATED APPLICATIONS

This application claims priority to Japanese Patent Application No. 2016-132181 filed on Jul. 4, 2016 which is incorporated herein by reference in its entirety including the specification, drawings and abstract.

BACKGROUND

1. Technical Field

The present disclosure relates to a battery charging system and a battery charging method for an electrically driven vehicle capable of charging a battery from an external power supply.

2. Description of Related Art

In electrically driven vehicles, such as a hybrid vehicle and an electric vehicle, which has a rotating electric machine as a drive source, a battery (main battery) is mounted as a power supply. Of the electrically driven vehicles, a plug-in hybrid vehicle, an electric vehicle, or the like is capable of performing charging (external charging) from a power supply (external power supply) outside the vehicle to the battery. These vehicles are provided with the following functions in relation to the external charging.

First, as a first function, a timer charging function is exemplified. For example, even though the battery is fully charged through the external charging once, if the vehicle is left from this time for a long period, the state of charge (SOC) of the battery decreases due to self-discharging. Furthermore, there is demand for performing the external charging targeting at a time zone at which electricity charge is relatively inexpensive. Accordingly, for example, in Japanese Patent Application Publication No. 2012-143026 (JP 2012-143026 A), an external charging timer which sets an external charging start time is provided in a vehicle. If an external charging plug is connected to a charging connector of the vehicle (plug-in), the presence or absence of setting of the external charging timer is determined. In a case where timer charging setting is made, a charging system transits to a pause state. With the timer charging setting, standby setting for making the execution of the external charging on standby (not permitted temporarily) before the external charging start time in order to prevent an erroneous operation of the external charging becomes valid, and if the external charging start time is reached, the standby setting is released and the external charging is executed.

Next, as a second function, a temperature increase (heating) function of the battery is exemplified. If the battery is frozen, mass transfer in the battery becomes difficult and internal resistance has a very high value. As a result, there is a concern that charging permissible electric power is reduced to 0 ($W_{in}$=0) and the external charging is inhibited. For example, if the battery is frozen during a timer charging setting period, thereafter, even if the external charging start time is reached, an ON operation (connection operation) of a charging relay which connects devices in the vehicle including the battery and the external power supply is inhibited.

Accordingly, for example, in Japanese Patent Application Publication No. 2012-191781 (JP 2012-191781 A), a temperature sensor is provided in a battery to constantly monitor a battery temperature. A heater control unit which performs on/off control of the heater operates the heater to increase the temperature of the battery if it is detected that the temperature of the battery becomes equal to or lower than a predetermined temperature.

SUMMARY

On the other hand, the operation of the heater to increase the temperature of the battery causes consumption of electric power of the battery. For example, if a battery temperature increase is frequently performed in a cold region or the like, there is a concern that so-called battery exhaustion is caused. Accordingly, an object of the present disclosure is to provide a battery charging system for an electrically driven vehicle capable of preventing battery exhaustion with a battery temperature increase during a period (timer charging setting period) before an external charging start time when standby setting of external charging is made with timer charging setting.

A first aspect of the present disclosure relates to a battery charging system for an electrically driven vehicle including a charging connector to which a charging plug of an external power supply is connected. The battery charging system includes a charging controller configured to control external charging for charging a battery with the external power supply, an external charging timer configured such that an external charging start time is able to be set by a user's operation, a temperature acquirer configured to acquire a battery temperature, and a heater configured to increase the battery temperature. In a case where the external charging start time is set in the external charging timer when the charging plug is inserted into the charging connector, the charging controller is configured to perform standby setting of the external charging before the external charging start time and transit to a pause state. The charging controller is configured to be intermittently activated during a timer charging setting period from a pause period start time at which transition is made to the pause state to the external charging start time, and when the battery temperature at a time of activation of the charging controller is equal to or lower than a predetermined temperature, execute a temperature increase mode in which the heater is operated to increase the battery temperature, and when the temperature increase mode is executed, the charging controller is configured to release the standby setting of the external charging and execute a temperature increase charging mode in which the external charging is performed.

In the above-described first aspect, the battery charging system may further include a timer switch configured to set an activation time during the timer charging setting period and to activate the charging controller at the activation time. In this case, the charging controller is configured to execute, as the temperature increase mode, a first temperature increase mode in which, in a case where the battery temperature is equal to or lower than a first temperature increase request temperature and higher than a second temperature increase request temperature lower than the first temperature increase request temperature at the activation time, the heater is operated to start a temperature increase of the battery, the activation time is reset after the battery increases in temperature to a first temperature increase target temperature, and then, transition is made to the pause state again. The charging controller is configured to execute, as the temperature increase mode, a second temperature increase mode in which, in a case where the battery temperature is equal to or lower than the second temperature increase request temperature at the activation time, the heater is operated to start the temperature increase of the battery, the activation time is reset after the battery increases in temperature to a second temperature increase target temperature with a temperature increase width from the second temperature increase request temperature smaller than a temperature increase width from the first temperature increase request temperature to the first temperature increase target temperature, and then, transition is made to the pause state again. The first temperature increase mode is set so as to be executed within a first period from an initial pause period start time, and the second temperature increase mode is set so as to be executed within a second period longer than the first period from the initial pause period start time.

As in the above-described configuration, since the second temperature increase mode has a temperature increase width, in other words, the amount of work, smaller than that of the first temperature increase mode, the power consumption of the heater and the related circuits is suppressed relatively (compared to the first temperature increase mode). The executable period of the second temperature increase mode is set to be longer than that of the first temperature increase mode, whereby it is possible to prevent the battery from being frozen over a long period while suppressing the power consumption of the heater and the related circuits, that is, suppressing battery exhaustion.

In the above-described first aspect, the charging controller may be configured to reset, as the activation time, a time after elapse of a first standby time from a time at which the battery temperature reaches the first temperature increase target temperature when the first temperature increase mode is executed. The charging controller may be configured to reset, as the activation time, a time after elapse of a second standby time shorter than the first standby time from a time at which the battery temperature reaches the second temperature increase target temperature when the second temperature increase mode is executed.

In the second temperature increase mode, since the temperature increase request temperature is lower than that in the first temperature increase mode, and accordingly, the temperature increase width from the temperature increase request temperature is smaller than that in the first temperature increase mode, the temperature increase target temperature is set to be lower than that in the first temperature increase mode. Accordingly, it is suitable that the battery temperature is measured at short intervals (frequently) in order to prevent the battery from being frozen. Accordingly, as in the above-described configuration, in the second temperature increase mode, it is possible to make the standby time to the next activation time shorter than the standby time in the first temperature increase mode.

In the above-described first aspect, the battery charging system may further include a notification unit configured to give notification to the user when the temperature increase charging mode is executed.

The temperature increase charging mode is external charging not intended by the user originally, and accordingly, unintended electricity charge occurs. The execution of the temperature increase charging mode is notified to the user, whereby it is possible to allow the user to recognize the occurrence of electricity charge with the execution of the temperature increase charging mode.

A second aspect of the present disclosure relates to a battery charging method for an electrically driven vehicle capable of performing external charging for charging a battery with an external power supply. The battery charging method includes, in a case where an external charging start time is set at the time of plug-in at which a charging plug of an external power supply is connected to an in-vehicle charging connector, performing standby setting of external charging before the external charging start time and transiting an electric control unit that controls the external charging to a pause state, intermittently activating the electric control unit during a timer charging setting period from a pause period start time at which the electric control unit is transited to the pause state to the external charging start time, and when the temperature of an in-vehicle battery is equal to or lower than a predetermined temperature at the time of the start of the external charging, executing a temperature increase mode in which a heater is operated to increase the temperature of the battery, and when the temperature increase mode is executed, releasing the standby setting of the external charging and executing a temperature increase charging mode in which the external charging is performed.

According to the present disclosure, it is possible to prevent battery exhaustion with an increase in temperature of the battery during the period (timer charging setting period) before the external charging start time at which the standby setting of the external charging is made with the timer charging setting.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a table illustrating the outline of first and second temperature increase modes;

FIG. 7 is a diagram showing another example of the temperature increase flow of the battery according to this embodiment.

DETAILED DESCRIPTION OF EMBODIMENTS

Figure 1:
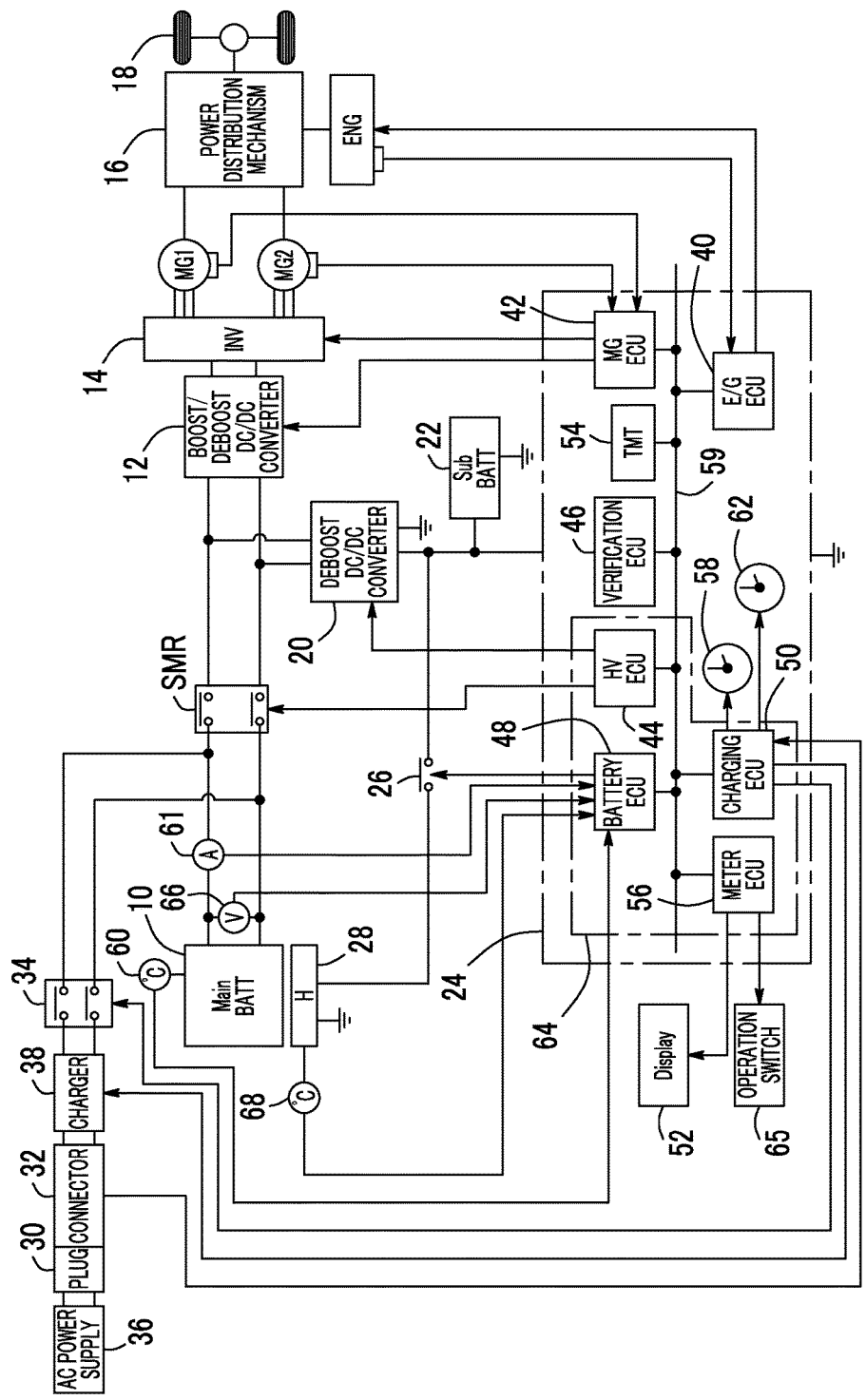
FIG. 1 is a diagram illustrating the configuration of a main part of a battery charging system according to this embodiment and an electrically driven vehicle in which the charging system for battery is mounted.

FIG. 1 illustrates the configuration of a battery charging system according to this embodiment and an electrically driven vehicle in which the battery charging system is mounted. For simplification, in FIG. 1, a configuration less relevant to the battery charging system according to this embodiment is appropriately omitted. An arrow of FIG. 1 represents a signal line.

The electrically driven vehicle shown in FIG. 1 is a plug-in hybrid vehicle which has an internal combustion engine ENG and rotating electric machines MG1, MG2 as a drive source, and is capable of performing charging (external charging) of a main battery 10 using an external power supply 36. However, a vehicle in which the battery charging system is mounted is not limited thereto, the charging system according to this embodiment may be mounted in an electric vehicle in which external charging with plug-in can be performed, or the like.

As shown in FIG. 1, DC electric power output from the main battery 10 is boosted by a boost/deboost DC/DC converter 12. Boosted DC electric power is DC-AC converted by an inverter 14. AC electric power after conversion is supplied to at least one of the rotating electric machines MG1, MG2.

For example, in an EV traveling mode in which the internal combustion engine ENG is not driven and the vehicle is made to travel only with drive power of the rotating electric machine, electric power is supplied from the main battery 10 to the rotating electric machine MG2, and drive power obtained from electric power is transmitted to wheels 18 through a power distribution mechanism 16.

In an HV traveling mode in which drive power is also output from the internal combustion engine ENG in addition to the rotating electric machine MG2, a part of drive power of the internal combustion engine ENG is transmitted to the wheels 18 through the power distribution mechanism 16. Remaining drive power is transmitted to the rotating electric machine MG1 through the power distribution mechanism 16, and accordingly, the rotating electric machine MG1 is driven to generate electric power. The generated electric power is supplied to the rotating electric machine MG2, and drive power obtained from the generated electric power is transmitted to the wheels 18 through the power distribution mechanism 16.

In the electrically driven vehicle shown in FIG. 1, a branch electrical path which is branched from an electrical path connecting the main battery 10 and the boost/deboost DC/DC converter 12 and is connected to a deboost DC/DC converter 20 is provided. DC electric power deboosted by the deboost DC/DC converter 20 is supplied to a sub-battery 22 and a control unit 24. A heater switch 26 is connected (turned on), whereby electric power is also supplied to a heater 28.

At the time of external charging, an external charging plug 30 is connected (plugged-in) to a charging connector 32. After plug-in, a charging relay 34 is switched from a shutoff state to a connection state. AC electric power supplied from the external power supply 36 is improved in power factor and AC-DC converted by a charger 38, and DC electric power after conversion is supplied to the main battery 10. Details of the external charging will be described below.

As shown in FIG. 1, the control unit 24 includes a plurality of electronic control units (ECUs). Specifically, the control unit 24 includes an engine ECU 40, an MG-ECU 42, an HV-ECU 44, a verification ECU 46, a battery ECU 48, a charging ECU 50, and a meter ECU 56.

The role of each ECU will be described briefly. The engine ECU 40 performs drive control of the internal combustion engine ENG. The MG-ECU 42 performs drive control of the rotating electric machines MG1, MG2 through control of the boost/deboost DC/DC converter 12 and the inverter 14. The HV-ECU 44 controls connection/shutoff of a system main relay SMR or controls the deboost DC/DC converter 20. The verification ECU 46 performs authentication of a smart key. The battery ECU 48 performs management of the main battery 10. The charging ECU 50 is a basic part of a charging control unit 64 which controls external charging as described below. The meter ECU 56 performs display control of displays, such as an in-vehicle display 52, or meters, or communication control of communication units, such as a telematics transceiver 54.

In this embodiment, of the ECUs described above, the HV-ECU 44, the battery ECU 48, the charging ECU 50, and the meter ECU 56 constitute the charging controller 64 in cooperation. This will be described below.

Each ECU described above may be constituted of an individual computer, or each ECU may be virtually modularized in one computer. In the former case where each ECU is constituted of an individual computer, these ECUs are configured to communicate with one another through a bus 59 (CAN bus) for a control area network (CAN).

<External Charging> Prior to the external charging, an ignition switch (not shown) of the electrically driven vehicle is turned off by a user, such as a driver. Accordingly, the HV-ECU 44 switches the system main relay SMR from the connection state to the shutoff state. When the ignition switch is turned off, each ECU of the control unit 24 is brought into a pause state. The pause (sleep) state indicates a state in which power supply to other than elements or circuits required for constant power supply, such as a nonvolatile memory, a timepiece, and an external charging timer 58 and a timer switch 62 described below, is shut off. A pause period indicates a period of the pause state, and during this period, electric power is supplied from the sub-battery 22.

After the ignition switch is turned off, the external charging plug 30 is connected (plugged-in) to the charging connector 32 of the vehicle by the user or the like of the vehicle. With plug-in, the charging ECU 50 is activated from the pause state. Electric power at the time of the activation is fed from the sub-battery 22. The charging ECU 50 confirms whether or not a charging timer function is set to be on, that is, whether or not an external charging start time is set with reference to the external charging timer 58.

In a case where the charging timer function is set to be on, after setting confirmation, the charging ECU 50 performs standby setting of the external charging (brings the standby setting into an on state), and transits to the pause state. Such an external charging standby function is a function for preventing an erroneous operation of the external charging during a timer charging setting period, and if this function becomes valid (in the on state), for example, a connection request of the charging relay 34 is brought into a hold state or is temporarily invalidated. The external charging timer 58 has a function of a timer switch, and if the external charging start time is reached, activates the charging ECU 50.

If the external charging start time is reached, the charging ECU 50 releases the standby setting of the external charging (brings the standby setting into an off state), and switches the charging relay 34 from the shutoff state to the connection state. The charger 38 is operated to perform power factor improvement and AC-DC conversion on AC electric power supplied from the external power supply 36. DC electric power after conversion is supplied to the main battery 10.

The charging ECU 50 activates the battery ECU 48 along with the connection of the charging relay 34. The battery ECU 48 calculates (estimate) the state of charge (SOC) of the main battery 10 through current integration by a current sensor 61, or the like. The calculated SOC is transmitted to the charging ECU 50, and the charging ECU 50 controls the external charging based on the SOC. For example, if the SOC reaches a predetermined charging end SOC, the charging ECU 50 switches the charging relay 34 from the connection state to the shutoff state, and ends the external charging.

At the time of the external charging, the charging ECU 50 activates the HV-ECU 44. The system main relay SMR is switched from the shutoff state to the connection state by the activated HV-ECU 44, and DC electric power supplied from the external power supply 36 and AC-DC converted through the charger 38 is supplied to the deboost DC/DC converter 20. DC electric power deboosted by the deboost DC/DC converter 20 is supplied to the sub-battery 22 and the control unit 24.

The battery ECU 48 acquires a temperature Tb (battery temperature) of the main battery 10 from a battery temperature sensor 60. If the battery temperature Tb is low (for example, equal to or lower than −10° C.), mass transfer in the main battery 10 becomes slow, causing an increase in internal resistance. The charging ECU 50 performs charging electric power limitation to reduce a charging permissible electric power ($W_{in}$) at the time of the external charging of the main battery 10 if internal resistance is large, and when the battery temperature Tb is low with increasing internal resistance, a charging period is extended due to the charging electric power limitation. It is known that, if the battery temperature Tb is low, charging capacity decreases, and there is also a concern that capacity shortage occurs in a specification temperature (recommended temperature) zone (for example, 0° C. to 50° C.) even in a fully charged state at low temperature.

Accordingly, in a case where the battery temperature Tb is low at the external charging start time, the battery ECU 48 turns on the heater switch 26 to operate the heater 28 and increases the temperature of the main battery 10. Specifically, in a case where the battery temperature Tb is equal to or lower than a predetermined first temperature increase request temperature A1, the battery ECU 48 increases the temperature of the main battery 10 to a first temperature increase target temperature B1 along with the external charging. The first temperature increase request temperature A1 is, for example, −10° C., and the first temperature increase target temperature B1 is, for example, 0° C. The main battery 10 increases in temperature to 0° C. in the specification temperature zone, whereby the charging electric power limitation is released and reduction in the charging period is achieved. The decrease in charging capacity is eliminated, whereby the main battery 10 is charged to capacity sufficient for EV traveling, for example.

In this embodiment, as described below, in addition to a temperature increase to the main battery 10 at the time of the external charging, even during the timer charging setting period in which the control unit 24 transits to the pause state with on setting of timer charging, a temperature increase is appropriately executed in order to prevent the main battery 10 from being frozen.

In this embodiment, when a temperature increase of the main battery 10 is executed during the timer charging setting period, the external charging standby setting is turned off (released), and the external charging to the main battery 10 is executed along with the temperature increase. With this, during the timer charging setting period, battery exhaustion of the main battery 10 with a battery temperature increase is prevented. While the external charging standby setting is released, the charging timer function is maintained to be on (valid). That is, the timer charging setting period is maintained valid.

<Battery Charging System> The battery charging system according to this embodiment includes the main battery 10, the battery temperature sensor (temperature acquirer) 60, the heater 28, the external charging timer 58, the timer switch 62, the in-vehicle display 52, the telematics transceiver 54, the HV-ECU 44, the battery ECU 48, the charging ECU 50, and the meter ECU 56. The HV-ECU 44, the battery ECU 48, the charging ECU 50, and the meter ECU 56 constitute the charging controller 64 in cooperation.

The main battery 10 is constituted of a secondary battery, such as a nickel-hydrogen or lithium-ion battery. For example, the main battery 10 is constituted of a stack (laminate) in which a plurality of battery cells (single cells) of about 1 to 5 V are laminated.

The battery temperature sensor 60 is a temperature acquirer which acquires the battery temperature Tb as the temperature of the main battery 10. The battery temperature sensor 60 is constituted of, for example, a thermistor, and the temperature detection element is attached to each battery cell of the main battery 10.

The heater 28 is provided near the main battery 10, and increases the temperature of the main battery 10. The heater switch 26 is provided between the heater 28, and the deboost DC/DC converter 20 and the sub-battery 22, and with on/off switching of the heater switch 26, a temperature increase by the heater 28 is controlled. DC electric power supplied from the main battery 10 is deboosted by the deboost DC/DC converter 20, and thereafter, DC electric power after deboosting is supplied to the heater 28 through the heater switch 26.

The in-vehicle display 52 is a notification unit which displays various kinds of information to an occupant in the vehicle. As described below, in a case where the external charging is executed (in a case where a temperature increase charging mode is executed) during the timer charging setting period, the effect is displayed on the in-vehicle display 52.

The telematics transceiver 54 is a notification unit which transmits various kinds of information of the vehicle to a terminal (for example, a smartphone) of the user, for example, an owner of the vehicle. As described below, in a case where the external charging is executed (in a case where the temperature increase charging mode is executed) during the timer charging setting period, a corresponding message is transmitted to the terminal of the user by the telematics transceiver 54.

The external charging timer 58 is a timer switch for executing a timer charging function in the external charging. The external charging timer 58 may be stored as a program in the charging ECU 50, or a timer switch device may be provided separately from the charging ECU 50. In the external charging timer 58, the external charging start time is set before plug-in by an input operation of the user or the like. Furthermore, the external charging timer 58 is configured to set an external charging end time. In this case, the charging ECU 50 calculates (calculates back) the external charging start time from the external charging end time set by the user, the SOC of the main battery 10, and the like.

The timer switch 62 is provided to activate the charging controller 64 (the HV-ECU 44, the battery ECU 48, the charging ECU 50, and the meter ECU 56) brought into the pause state by the timer charging function. As described below, the timer switch 62 defines an activation time during the timer charging setting period from a start time of a pause period in which the charging controller 64 transits to the pause state to the external charging start time. In addition, the timer switch 62 activates the charging controller 64 at the activation time. The timer switch 62 may be stored as a program in the charging ECU 50, or a timer switch device may be provided separately from the charging ECU 50. The activation timing setting to the timer switch 62 will be described below.

The meter ECU 56 performs display control of the in-vehicle display 52. A storage unit (not shown) of the meter ECU 56 stores various messages. For example, when the temperature increase charging mode described below is executed, the meter ECU 56 calls a corresponding message from the storage unit and displays the message on the in-vehicle display 52. The meter ECU 56 transmits the same message to the terminal of the user through the telematics transceiver 54.

The battery ECU 48 performs management of the main battery 10. Specifically, the battery ECU 48 performs management of the SOC, deterioration state, temperature, and the like of the main battery 10. The battery ECU 48 respectively acquires the current, the voltage, and the battery temperature Tb of the main battery 10 from the current sensor 61, a voltage sensor 66, and the battery temperature sensor 60. Furthermore, the battery ECU 48 acquires a heater temperature from a heater temperature sensor 68. In addition, the battery ECU 48 is configured to operate the heater switch 26, and controls the heater 28 through on (connection)/off (shutoff) of the heater switch 26.

The charging ECU 50 is a basic part of the charging controller 64 which controls the external charging. The charging ECU 50 detects that plug-in is executed by receiving a plug-in signal output from the charging connector 32 when the external charging plug 30 is inserted. Furthermore, the charging ECU 50 controls an on/off operation of a switching element (not shown) of the charger 38, thereby performing control for power factor conversion or AC-DC conversion. Furthermore, the charging ECU 50 is configured to switch connection/shutoff of the charging relay 34. In addition, when the timer charging function is set to be on and the external charging start time is reached, the charging ECU 50 receives an activation signal from the external charging timer 58. Furthermore, the charging ECU 50 sets the activation time to the timer switch 62, and if the activation time is reached, receives an activation signal from the timer switch 62.

In the battery charging system according to this embodiment, during the timer charging setting period in which the timer charging function is set to be on and the control unit 24 transits to the pause state, in order to prevent the main battery 10 from being frozen, the charging controller 64 (the HV-ECU 44, the battery ECU 48, the charging ECU 50, and the meter ECU 56) is intermittently activated at a predetermined activation time using the timer switch 62. In addition, as described below, the charging controller 64 operates the heater 28 according to the battery temperature Tb during the above-described timer charging setting period to increase the temperature of the main battery 10. With this, it is possible to prevent the main battery 10 from being frozen during the timer charging setting period. The charging controller 64 is appropriately paused during the timer charging setting period to be intermittently activated without being constantly in the on state, whereby it is possible to suppress power consumption during the timer charging setting period.

In this embodiment, when the heater 28 is operated to increase the temperature of the main battery 10 during the above-described timer charging setting period, along with the temperature increase, the external charging standby setting is released and the external charging to the main battery 10 is executed. The main battery 10 to be a power supply of the heater 28 is externally charged, whereby it is possible to prevent battery exhaustion of the main battery 10 with a temperature increase of the main battery 10.

<Temperature Increase Mode> FIG. 2 illustrates the temperature increase mode of the main battery 10 which is executed during the timer charging setting period. In this embodiment, two temperature increase modes including a first temperature increase mode and a second temperature increase mode are set according to the battery temperature Tb. In both temperature increase modes, when the battery temperature Tb is equal to or lower than a predetermined temperature at the activation time of the charging controller 64, the heater 28 is operated to increase the temperature of the main battery 10.

The first temperature increase mode is for the purpose of eliminating a decrease in capacity of the main battery 10 due to a low temperature and sufficiently securing a cruising distance of EV traveling. The first temperature increase mode is executed when the battery temperature Tb is equal to or lower than the first temperature increase request temperature A1 and becomes higher than (exceeds) a second temperature increase request temperature A2. The first temperature increase request temperature A1 is, for example, $-10°$ C., and the second temperature increase request temperature A2 is, for example, $-25°$ C. That is, the first temperature increase mode is executed when $-25°$ C.$<Tb\leq-10°$ C. For the battery temperature Tb to be a reference for determining whether or not to execute the first temperature increase mode, for example, a temperature acquired from the battery temperature sensor 60 at the time of the activation of the charging ECU 50, that is, at the time of plug-in or at the time of the activation by the timer switch 62 is used.

In the first temperature increase mode, the charging controller 64 operates the heater 28 to increase the temperature of the main battery 10 to the first temperature increase target temperature B1. As described above, since the first temperature increase mode is for the purpose of sufficiently securing the cruising distance of EV traveling, the first temperature increase target temperature B1 is included in the specification temperature (recommended temperature) zone of the main battery 10. For example, the first temperature increase target temperature B1 is $0°$ C.

The first temperature increase mode (and the second temperature increase mode) can be executed multiple times during the timer charging setting period. Specifically, in the first temperature increase mode, a standby time C1 to the next activation of the charging controller 64 is determined. The standby time C1 is, for example, 12 hours.

As described below, the first temperature increase mode has a large temperature increase width from the temperature increase request temperature to the temperature increase target temperature greater compared to the second temperature increase mode, and since the amount of work becomes large as much, the load or power consumption of the heater 28 or the related circuits is relatively large. Accordingly, an executable period D1 of the first temperature increase mode is set to be shorter than an executable period D2 of the second temperature increase mode. The executable period D indicates a period in which the execution of each temperature increase mode is enabled (permitted) from the beginning of the timer charging setting period. For example, the executable period D1 of the first temperature increase mode is set to seven days, and the executable period D2 of the second temperature increase mode is set to 31 days. The beginning of the timer charging setting period indicates an initial pause period start time, that is, a time at which transition is made to the pause state initially after plug-in, and in FIG. 3 described below, indicates a time at which the process progresses to Step S22 initially.

The executable period D1 of the first temperature increase mode is set to be relatively short, whereby it is possible to reduce the load of the heater 28 and the related circuits. An execution frequency of the first temperature increase mode having relatively large power consumption is suppressed to be low, whereby it is possible to suppress battery exhaustion of the main battery 10.

In the second temperature increase mode, priority is given to suppressing the load or power consumption of the heater and the related circuits over securing the cruising distance of EV traveling. The second temperature increase mode is executed when the battery temperature Tb is equal to or lower than the second temperature increase request temperature A2 (Tb≤A2). As described above, the second temperature increase request temperature A2 is, for example, −25° C. The second temperature increase request temperature A2 is set to be lower than the first temperature increase request temperature A1, whereby it is possible to suppress the activation of the heater 28.

In the second temperature increase mode, the charging controller 64 operates the heater 28 to increase the temperature of the main battery 10 to a second temperature increase target temperature B2. The second temperature increase target temperature B2 is set such that a temperature increase width ΔT2 from the second temperature increase request temperature A2 becomes smaller than a temperature increase width ΔT1 from the first temperature increase request temperature A1 to the first temperature increase target temperature B1 (ΔT1>ΔT2). The second temperature increase target temperature B2 is set to, for example, −20° C. That is, while ΔT1=10° C., ΔT2=5° C.

As described above, the executable period D2 of the second temperature increase mode is set to be longer than the executable period D1 of the first temperature increase mode. The executable period D2 of the second temperature increase mode is set to, for example, 31 days.

The executable period D2 of the second temperature increase mode is set to be relatively long, whereby it is possible to prevent the main battery 10 from being frozen while suppressing the load of the heater 28 and the related circuits. In particular, the executable period D2 of the second temperature increase mode is set to match a maximum setting period of timer charging, whereby it is possible to prevent the main battery 10 from being frozen over the entire timer charging setting period. The temperature increase mode whose executable period is set to be relatively long is defined as the second temperature increase mode having relatively small power consumption, thereby suppressing battery exhaustion of the main battery 10.

As shown in the time chart of FIG. 6 described below, in many cases, plug-in to be a trigger on which a battery temperature increase flow according to this embodiment is activated is executed in a short time after the ignition switch (not shown) of the vehicle is turned off. At this time, the main battery 10 is in the specification temperature zone by heat with discharging/charging at the time of ignition-on or the operation of peripheral devices. Accordingly, if the main battery 10 is cooled by outside air after plug-in, first, the battery temperature Tb decreases to the first temperature increase request temperature A1, and accordingly, the first temperature increase mode is executed. That is, the first temperature increase mode is primarily executed during the executable period D1 after plug-in, and the second temperature increase mode is executed if the executable period D1 is exceeded.

A standby time C2 (to the next activation) of the second temperature increase mode is set to be shorter than the standby time C1 of the first temperature increase mode. In the second temperature increase mode, since the temperature increase request temperature A2 is set to be relatively low, and the temperature increase width ΔT2 is set to be relatively small, the temperature increase target temperature B2 is lower than the temperature increase target temperature B1. That is, a possibility that the main battery 10 is frozen becomes relatively high. For this reason, at the time of the execution of the second temperature increase mode, in order to prevent the battery from being frozen, it is configured such that the battery temperature can be acquired at short intervals (frequently). The standby time C2 of the second temperature increase mode is set to, for example, six hours.

Figure 3:
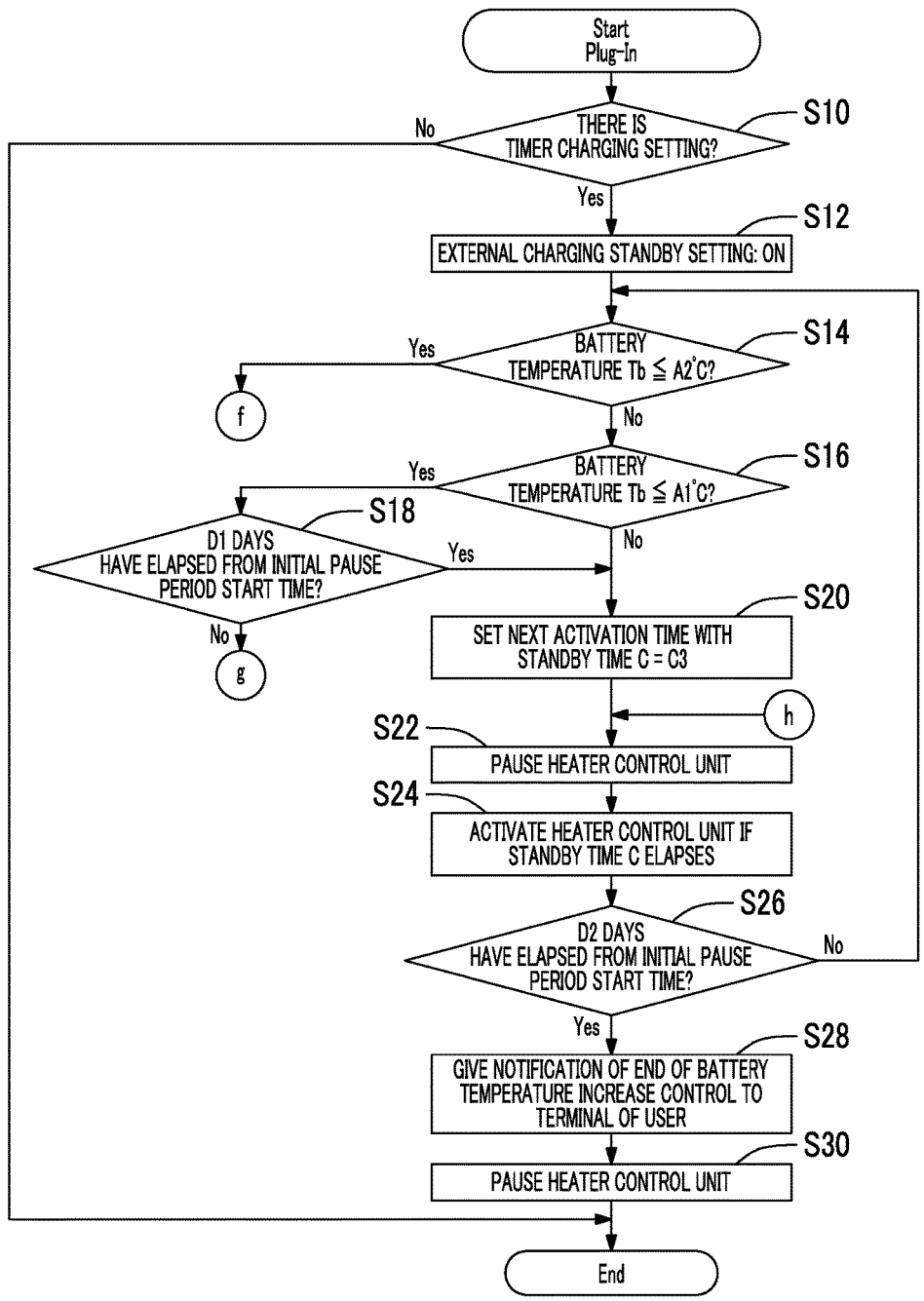
FIG. 3 is a diagram illustrating a temperature increase flow of a battery according to this embodiment (1/3)
Figure 4:
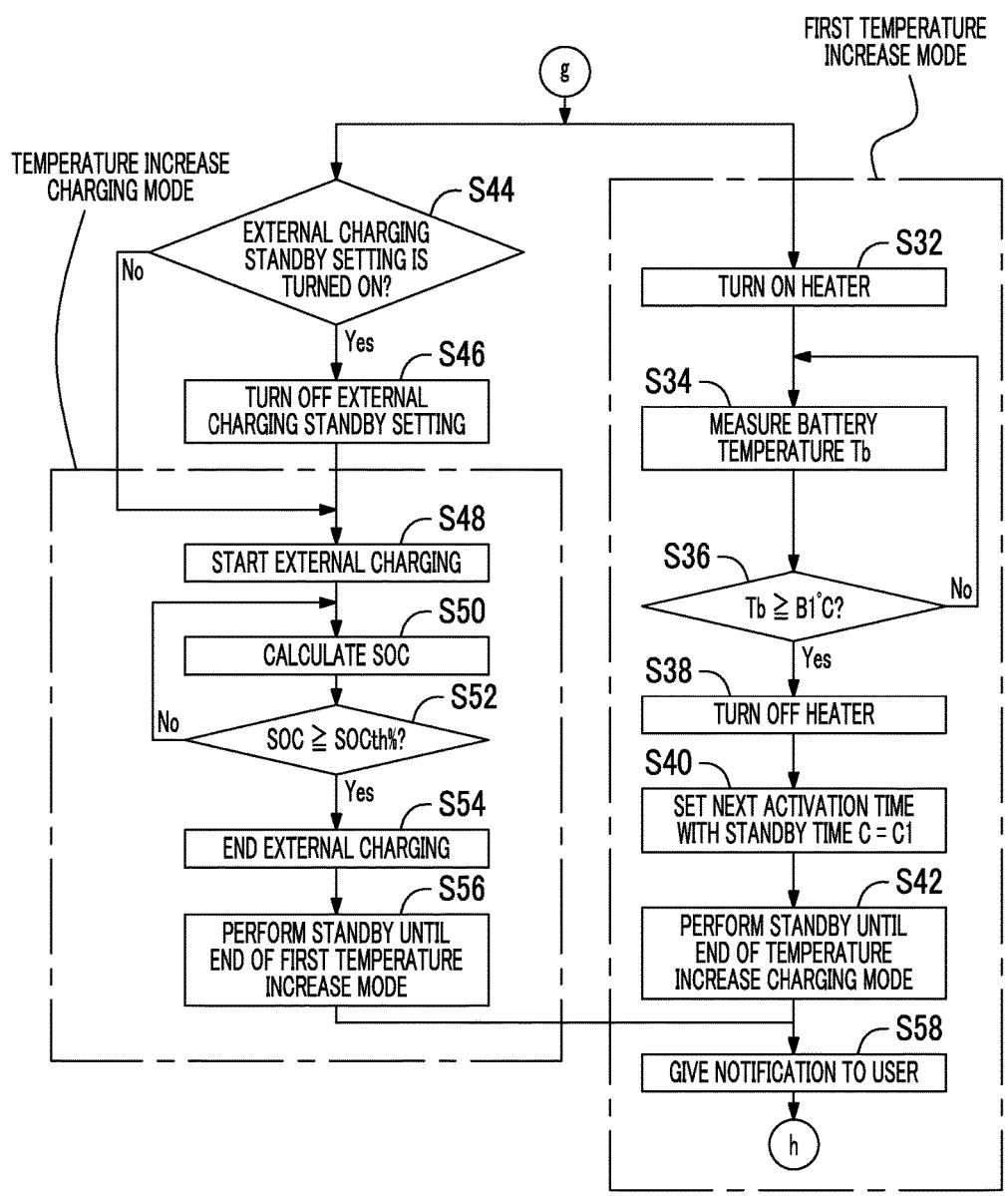
FIG. 4 is a diagram illustrating the temperature increase flow of the battery according to this embodiment (2/3)
Figure 5:
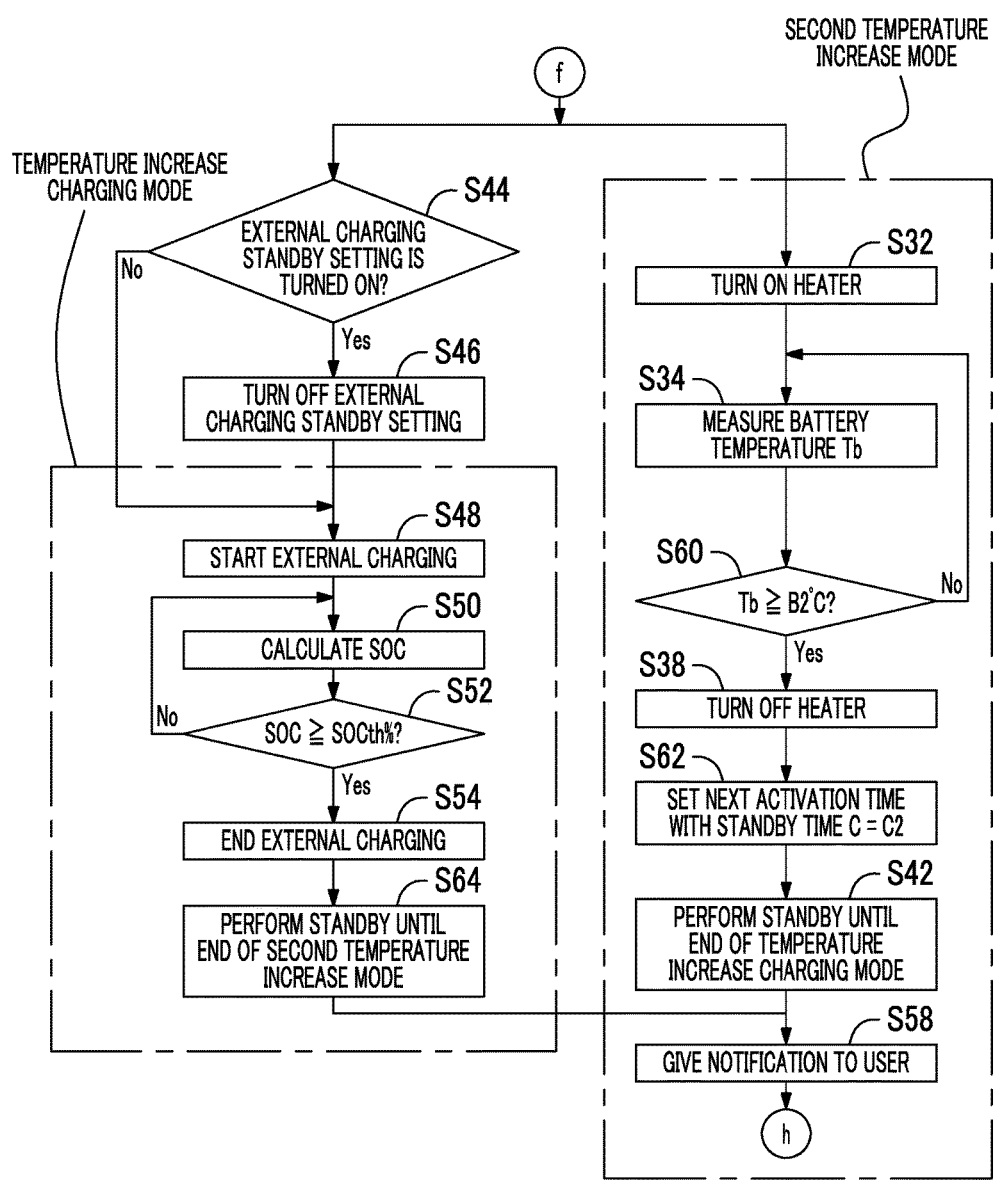
FIG. 5 is a diagram illustrating the temperature increase flow of the battery according to this embodiment (3/3)

<Main Battery Temperature Increase Flow> FIGS. 3 to 5 illustrate a temperature increase flow of the main battery 10 during the timer charging setting period. This flow is executed by the charging controller 64. A program for executing the temperature increase flow is stored in, for example, a storage unit (not shown) of the charging ECU 50.

Since the main battery temperature increase flow is a flow for preventing the main battery 10 from being frozen during the timer charging setting period, the main battery temperature increase flow forcibly ends, for example, when the external charging start time by the timer charging function is reached. Simultaneously with this, the external charging standby setting is released (set to be off).

Since the main battery temperature increase flow is a flow for preventing the main battery 10 from being frozen, the flow may be stopped in summer or the like when the battery is not frozen. For example, the execution/stop of the main battery temperature increase flow shown in FIGS. 3 to 5 may be selected and set using the in-vehicle display 52 and an operation switch 65.

The main battery temperature increase flow is configured on the assumption that the state of plug-in in which the charging connector 32 is inserted into the charging plug 30 is maintained. Accordingly, at the time of plug-out at which the charging plug 30 is pulled from the charging connector 32, the temperature increase flow forcibly ends. Simultaneously with this, the external charging standby setting is released (set to be off).

Referring to FIG. 3, the temperature increase flow starts with plug-in, at which the charging connector 32 is inserted into the charging plug 30, as a trigger. The charging ECU 50 which is activated from the pause state by plug-in confirms the timer charging setting of the external charging timer 58 (S10). In a case where the timer charging function is set to be off, this flow ends.

In a case where the timer charging function is set to be on, that is, in a case where the external charging start time is set in the external charging timer 58, the charging ECU 50 performs the standby setting of the external charging before the timer charging setting period, that is, the external charging start time (turns on the external charging standby setting) (S12). Subsequently, while the charging controller 64 transits to the pause state, before transition, it is determined whether or not a temperature increase of the main battery 10 is required.

The charging ECU 50 acquires the battery temperature Tb at the time of the activation of the charging controller 64, that is, at the time of plug-in from the battery ECU 48, and determines whether or not the battery temperature Tb is equal to or lower than the second temperature increase request temperature A2 (S14). In a case where the battery temperature Tb is equal to or lower than the second temperature increase request temperature A2, the second temperature increase mode and the temperature increase charging mode shown in FIG. 5 are executed.

In a case where the battery temperature Tb becomes higher than (exceeds) the second temperature increase request temperature A2, the charging ECU 50 determines whether or not the battery temperature Tb is equal to or lower than the first temperature increase request temperature A1 (S16). In a case where the battery temperature Tb is equal to or lower than the first temperature increase request temperature A1, the charging ECU 50 confirms that executable period of the first temperature increase mode. That is, the charging ECU 50 determines whether or not a current time passes a first executable period D1 from the start time (the initial pause period start time, that is, the time at which transition is made to the pause state initially after plug-in) of the timer charging setting period (S18). In a case where the current time has not passed the first executable period D1, the first temperature increase mode and the temperature increase charging mode shown in FIG. 4 are executed.

In a case where the current time has passed the first executable period D1 from the initial pause period start time, and in a case where, in Step S16, the battery temperature Tb becomes higher than the first temperature increase request temperature A1, a temperature increase to the main battery 10 is not performed, and the next activation time is set. That is, the charging ECU 50 sets the activation time to the timer switch 62 (S20). As the activation time, a time after a third standby time C3 from the current time is set. The third standby time C3 may be equal to the standby time C1 of the first temperature increase mode (C3=C1).

After the activation time is set in the timer switch 62, the charging controller 64, that is, the HV-ECU 44, the charging ECU 50, the battery ECU 48, and the meter ECU 56 transit to the pause state (S22).

A normal plug-in operation is executed quickly after the vehicle is stopped, and the battery temperature Tb is included in a use temperature zone by charging/discharging with last vehicle traveling. Accordingly, the temperature increase of the main battery 10 is rarely executed immediately after plug-in. In many cases, after the on setting of the timer charging function is confirmed (S10), the external charging standby setting is turned on (S12), and transition is made to the pause state as it is (S22).

If the standby time C3 has elapsed, the timer switch 62 activates the charging controller 64 (S24). Specifically, an activation command is transmitted from the timer switch 62 to the charging ECU 50, and accordingly, the charging ECU 50 is activated. Electric power at the time of the activation is fed from the sub-battery 22. Next, the charging ECU 50 transmits an activation command to the HV-ECU 44, the battery ECU 48, and the meter ECU 56, and activates these ECUs.

The charging ECU 50 determines whether or not the activation time is a time after elapse of a second executable period D2 from the initial pause period start time (the time at which the process progresses to Step S22 initially) (S26). In a case where the activation time has not passed the second executable period D2, the process returns to Step S14.

In a case where the activation time set in the timer switch 62 has passed the second executable period D2 from the initial pause period start time, since D1<D2, the first executable period D1 has also elapsed. That is, the execution of the first temperature increase mode or the second temperature increase mode is not permitted. At this time, the meter ECU 56 transmits a message to the effect of the end of a temperature increase function of the main battery 10 to the terminal of the user through the telematics transceiver 54 (S28). Thereafter, the charging controller 64 transits to the pause state (S30), and the flow ends.

FIG. 4 illustrates a flow of the first temperature increase mode. In FIG. 4, for convenience, while the flow of Step S32 in which the heater 28 is turned on to reference symbol h indicating that the process returns to Step S22 of FIG. 3 is surrounded by a one-dot-chain line as the first temperature increase mode, actually, Step S22 ahead of reference symbol h is also included in the first temperature increase mode. In this embodiment, in parallel with the first temperature increase mode, the release of the external charging standby setting and the temperature increase charging mode in which the external charging of the main battery 10 is perfoinied are executed. The external charging of the main battery 10 is performed along with the execution of the temperature increase mode, and electric power which is consumed at the time of the temperature increase is fed to the main battery 10.

In Step S18 (FIG. 3), in a case where the time at which the charging controller 64 is activated has not yet reached the time after elapse of the first executable period D1 from the first pause period start time, the first temperature increase mode and the temperature increase charging mode are executed.

At the time of the execution of the first temperature increase mode, the HV-ECU 44 switches the system main relay SMR from the shutoff state to the connection state. With this, electric power is supplied from the main battery 10 to the deboost DC/DC converter 20. The battery ECU 48 switches the heater switch 26 from the shutoff (off) state to the connection (on) state. As a result, electric power deboosted by the deboost DC/DC converter 20 is supplied to the heater 28 (S32).

At this time, electric power deboosted by the deboost DC/DC converter 20 is also supplied to the sub-battery 22 in addition to the heater 28. As described above, the sub-battery 22 becomes a power supply when activating the charging controller 64 from the pause state. The sub-battery 22 is charged at the time of the execution of the first temperature increase mode (and the same applies to the second temperature increase mode described below), whereby electric power during a subsequent timer charging setting period and when activating the charging controller 64 is secured.

If the heater 28 is brought in the on state, the battery ECU 48 receives the battery temperature Tb from the battery temperature sensor 60 (S34). In a case where the battery temperature sensor 60 is constituted of a thermistor, the battery ECU 48 applies a predetermined voltage to the thermistor, and calculates the battery temperature Tb from a resistance value of the thermistor with the application of the predetermined voltage. The battery ECU 48 determines whether or not the battery temperature Tb becomes equal to or higher than the first temperature increase target temperature B1 (S36). In a case where the battery temperature Tb is lower than the first temperature increase target temperature B1, the process returns to Step S34.

If it is determined in Step S36 that the battery temperature Tb becomes equal to or higher than the first temperature increase target temperature B1, the battery ECU 48 switches the heater switch 26 from the connection state to the shutoff state to turn off the heater 28 (S38).

Thereafter, the charging ECU 50 resets the activation time set in the timer switch 62 (S40). Specifically, the charging ECU 50 resets, as the next activation time, a time after elapse of the first standby time C1 from a temperature increase end time, that is, a time at which the battery temperature Tb reaches the first temperature increase target temperature B1. After resetting, the charging ECU 50 stands by until the temperature increase charging mode ends (S42).

In parallel with the execution of the first temperature increase mode, the charging ECU 50 determines whether or not the external charging standby setting is in the on state (S44). In a case where on setting is made, the charging ECU 50 releases the external charging standby setting (turns off the external charging standby setting) (S46). With this, the external charging is enabled during the timer charging setting period. Accordingly, the charging ECU 50 executes the temperature increase charging mode. The charging ECU 50 switches the charging relay 34 from the shutoff state to the connection state, and drives the charger 38. Accordingly, electric power is supplied from the external power supply 36 to the main battery 10 (S48).

The battery ECU 48 integrates the current value by the current sensor 61, thereby calculating (estimating) the SOC of the main battery 10 (S50). The battery ECU 48 determines whether or not the calculated SOC is equal to or greater than a predetermined charging end SOCth (full charge SOC) (S52).

In a case where the calculated SOC is less than the charging end SOCth, the process returns to Step S50 and the external charging is continued. In a case where the calculated SOC is equal to or greater than the charging end SOCth, the charging ECU 50 ends the external charging (S54), and ends the temperature increase charging mode. For example, a boosting rate of the charger 38 is controlled such that an output voltage of the charger 38 becomes equal to or less than a voltage value corresponding to the charging end SOCth of the main battery 10. Thereafter, the charging ECU 50 and other ECUs constituting the charging controller 64 stand by until the first temperature increase mode ends (S56).

In a case where the temperature increase charging mode ends earlier than the first temperature increase mode, the flow shown in FIG. 4 is brought into a standby state in Step S56. If the first temperature increase mode ends, the process progresses from Step S56 to next Step S58. The flow of the first temperature increase mode passes through Step S42 after the first temperature increase mode ends (S40). That is, the process progresses from Steps S56 and S42 to Step S58 substantially simultaneously (at least at the same clock count).

In Step S58, the execution of the external charging and the first temperature increase mode is notified to the user. As described above, the temperature increase charging mode and the first temperature increase mode are basically executed during the timer charging setting period in which no occupant is in the vehicle. A notification step of Step S58 is provided, whereby it is possible to allow the user to know that the external charging and the first temperature increase mode are executed. In particular, the execution of the external charging not intended by the user is notified, whereby it is possible to allow the user to recognize the occurrence of electricity charge with the execution of the external charging.

The meter ECU 56 displays a message on the in-vehicle display 52. For example, a message, such as "since a battery for drive is at low temperature, charging and a temperature increase are given priority", is displayed on the in-vehicle display 52. Along with the display of the message, the operation switch 65 for operating the display content of the in-vehicle display 52 is locked, such that the display of the message does not disappear. The user who gets in the vehicle visually recognizes the message, thereby knowing the execution of the external charging and the temperature increase mode. The meter ECU 56 transmits the same message to the terminal of the user through the telematics transceiver 54. After Step S58, the process returns to Step S22 of FIG. 3, and the charging controller 64 transits to the pause period.

FIG. 5 illustrates the flow of the second temperature increase mode. In FIG. 5, for convenience, while the flow of Step S32 in which the heater 28 is turned on to reference symbol h indicating the process returns to Step S22 of FIG. 3 is surrounded by a one-dot-chain line as the second temperature increase mode, actually, Step S22 ahead of reference symbol h is also included in the second temperature increase mode.

In this embodiment, similarly to the first temperature increase mode, the release of the external charging standby setting and the temperature increase charging mode are executed in parallel with the second temperature increase mode. The same steps as those in FIG. 4 are represented by the same reference numerals, and description thereof will be appropriately omitted. In Step S14 (FIG. 3), if it is determined that the battery temperature Tb is equal to or lower than the second temperature increase request temperature A2, the second temperature increase mode and the temperature increase charging mode are executed.

The second temperature increase mode is different from the first temperature increase mode in that a comparison target with the battery temperature Tb at the time of a temperature increase is the second temperature increase target temperature B2 (S60). At the time of resetting of the activation time of the timer switch 62, the charging ECU 50 resets, as the next activation time, a time after elapse of the second standby time C2 from the temperature increase end time, that is, the time at which the battery temperature Tb reaches the second temperature increase target temperature B2 (S62). In the second temperature increase mode, the same processing as in the first temperature increase mode is executed excluding change of the parameter to be the comparison target described above.

In regard to the release of the external charging standby setting and the temperature increase charging mode which are executed in parallel with the second temperature increase mode, the same processing as in the flow shown in FIG. 4 is executed excluding that, in Step S64, standby is performed until the second temperature increase mode ends.

EXAMPLE

Figure 6:
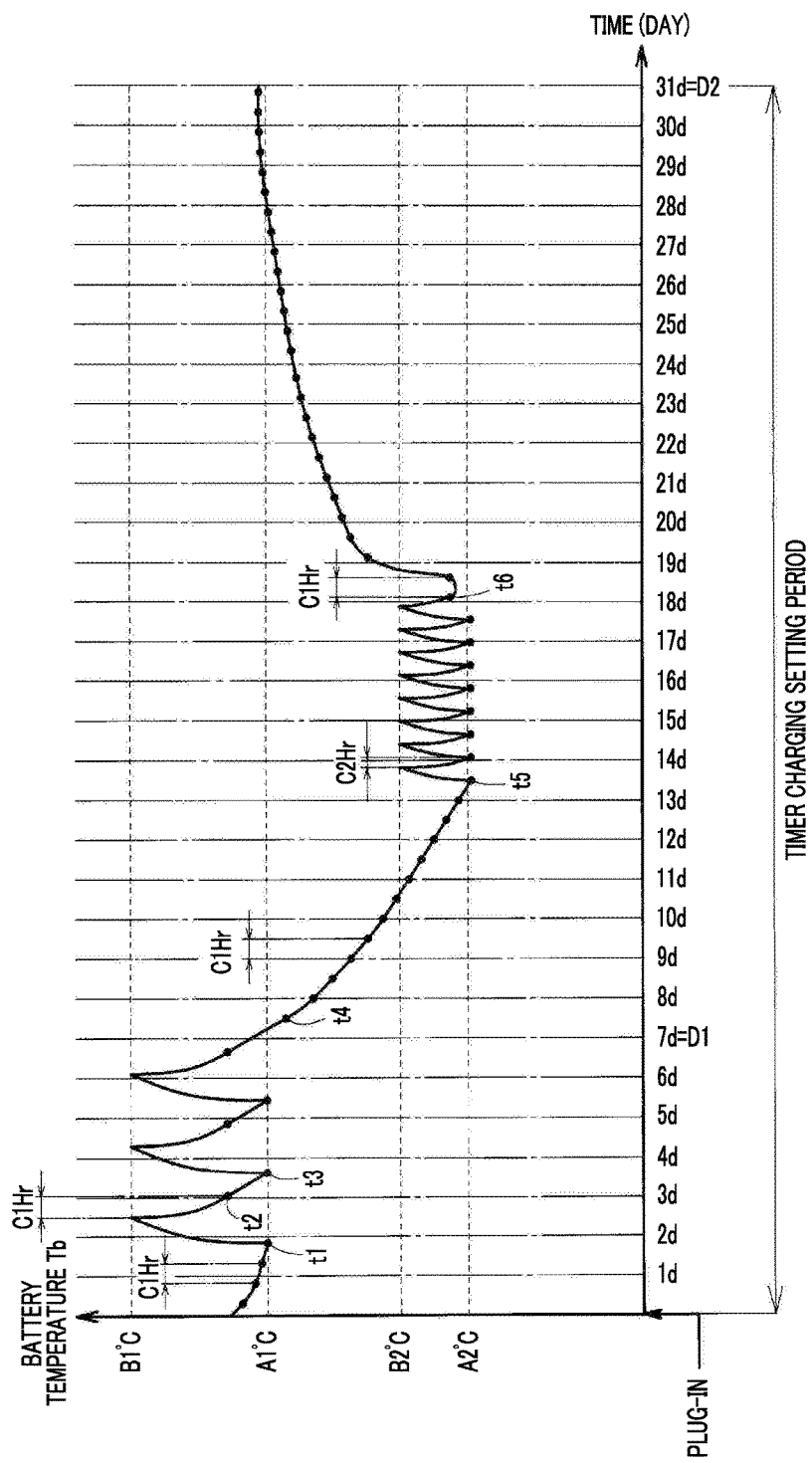
FIG. 6 is a time chart when the temperature increase flow of the battery according to this embodiment is executed.

FIG. 6 illustrates a time chart when the main battery temperature increase flow according to this embodiment is executed. The vertical axis indicates the battery temperature Tb, and the horizontal axis indicates time (day). The timer charging setting period is set to 31 days. In this example, the first executable period D1 is set to seven days, and the second executable period D2 is set to 31 days. In this example, the first standby time C1 is set to 12 hours, the second standby time C2 is set to six hours, and the third standby time C3 is set to 12 hours.

In this time chart, it is supposed that the vehicle is left for a long period in a state where the charging connector 32 is connected (plugged-in) to the charging plug 30. For example, a case where the vehicle is parked at a parking lot with an external charging function for a long period in a cold region, or the like is included.

If the charging plug 30 is connected (plugged-in) to the charging connector 32, the charging controller 64 is activated. The charging ECU 50 of the charging controller 64 acquires the battery temperature Tb at the time of the activation from the battery temperature sensor 60 by way of the battery ECU 48. Normally, plug-in is executed in a short time after vehicle traveling. The battery temperature Tb is included in the use temperature zone by charging/discharging with vehicle traveling. In such a case, since the temperature increase of the main battery 10 is not required, the charging ECU 50 turns on (validates) the external charging standby setting (S12), and then, sets a time after elapse of the third standby time C3 from the activation time by plug-in in the timer switch 62 as the next activation time. Thereafter, the charging controller 64 transmits to the pause state (S14→S16→S20→S22). After elapse of the third standby time C3, as indicated by dots (.) in the time chart of FIG. 6, the charging controller 64 is activated (S24). In FIG. 6, since the battery temperature Tb becomes higher than the first temperature increase request temperature A1 even at the activation time, the charging ECU 50 resets a time after elapse of the third standby time C3 from the activation time (current time) in the timer switch 62 as the next activation time (S26→S14→S16→S20→S22→S24→S26). The reactivation of the charging controller 64 and the resetting to the timer switch 62 are repeatedly executed to a time t1.

If the charging controller 64 is activated at the time t1, the battery temperature Tb is equal to or lower than the first temperature increase request temperature A1 and becomes higher than the second temperature increase request temperature A2 at the time t1. In response to this, the charging controller 64 executes the first temperature increase mode (S24→S26→S14→S16→S18→the first temperature increase mode). In parallel with this, the external charging standby setting is released (S46), and the temperature increase charging mode is executed.

If the battery temperature Tb reaches the first temperature increase target temperature B1, the first temperature increase mode ends. If the SOC of the main battery 10 reaches the charging end SOCth, the temperature increase charging mode ends. The charging ECU 50 resets a time after elapse of the first standby time C1 from the end time of the first temperature increase mode in the timer switch 62 as the next activation time, and thereafter, transits to the pause state.

At a next activation time t2, since the battery temperature Tb becomes higher than the first temperature increase request temperature A1 (A1<Tb), the first and second temperature increase modes are not executed, and the next activation time is reset. At a next activation time t3, since the battery temperature Tb is equal to or lower than the first temperature increase request temperature A1 and becomes higher than the second temperature increase request temperature A2, the first temperature increase mode (and the temperature increase charging mode) is executed again. Hereinafter, the same processing as at the time t1 and the time t2 is executed to a time t4.

At the time t4, since the first executable period D1 has elapsed from the initial pause period start time, the first temperature increase mode is not executed. That is, after the time t4, the process constantly progresses from Step S18 in the flow of FIG. 3 to Step S20. In this case, the temperature increase of the main battery 10 is not executed until the battery temperature Tb becomes equal to or lower than the second temperature increase request temperature A2, and the activation of the charging controller 64 and the resetting of the activation time are repeated.

If a time t5 is reached, since the battery temperature Tb becomes equal to or lower than the second temperature increase request temperature A2, the second temperature increase mode and the temperature increase charging mode are executed. If the battery temperature Tb reaches the second temperature increase target temperature B2, the second temperature increase mode ends. If the SOC of the main battery 10 reaches the charging end SOCth, the temperature increase charging mode ends. The charging ECU 50 resets a time after elapse of the second standby time C2 from a time, at which the battery temperature Tb reaches the second temperature increase target temperature B2, in the timer switch 62 as the next activation time.

Hereinafter, the second temperature increase mode is executed on the occasion of reactivation. An activation interval is set to the relatively short second standby time, whereby the main battery 10 is prevented from being frozen.

After a time t6, the temperature of the main battery 10 increases due to an outside air temperature. This illustrates, for example, behavior after a cold wave has passed. Since the battery temperature Tb falls below the first temperature increase request temperature A1, but does not exceed the executable period D1 of the first temperature increase mode, the reactivation of the charging controller 64 and the resetting of the activation time are repeated to the external charging start time (31d).

Other Embodiments

In the foregoing embodiment, although, as the battery temperature Tb at the activation time of the charging controller 64, a measurement value of the battery temperature sensor 60 at the same time is used, the present disclosure is not limited to this form. For example, an estimation value of the battery temperature Tb at the same time may be calculated.

An estimation value $Tb\_es(t_{n+1})$ of the battery temperature at a time $t_{n+1}$ after elapse of a given time tw from a predetermined time (time $t_n$) can be calculated using following Expression (1) described below. $Tb\_t_n$ indicates the battery temperature at the time $t_n$, and α indicates an estimated environmental temperature at the same time $t_n$. D is a prescribed constant.

$$Tb\_es(t_{n+1}) = (Tb\_t_n - \alpha)e^{-D/tw} + \alpha \qquad (1)$$

Expression (1) described above is stored in the charging controller 64, for example, a storage unit (not shown) of the battery ECU 48. The battery ECU 48 substitutes the battery temperature $Tb\_t_n$ at the current time $t_n$ acquired from the battery temperature sensor 60 and the standby time tw from the current time $t_n$ to a next activation time $t_{n+1}$ of the charging controller 64 in Expression (1), thereby obtaining the estimation value $Tb\_es(t_{n+1})$ of the battery temperature at the next activation time.

The estimation value $Tb\_es(t_{n+1})$ of the battery temperature at the next activation time $t_{n+1}$ is compared with the measurement value Tb of the battery temperature acquired from the battery temperature sensor 60 at the time $t_{n+1}$, and the estimated environmental temperature α is corrected according to the difference. This correction is repeatedly executed, whereby it is possible to increase the estimation accuracy of the estimation value Tb_es of the battery temperature.

The estimation value Tb_es of the battery temperature is used, whereby it is possible to progress a part of the flows of FIGS. 3 to 5 preliminarily. For example, an estimation value $Tb\_es(t_{n+1})$ of the battery temperature at the next activation time $t_{n+1}$ may be estimated at the current activation time $t_n$, and S10 to S16 in the flow of FIG. 3 at the next activation time $t_{n+1}$ can progress at the current time $t_n$ based on the estimation value $Tb\_es(t_{n+1})$. That is, at the current time $t_n$, it is possible to determine which of (1) the execution of the first temperature increase mode and the temperature increase charging mode, (2) the execution of the second temperature increase mode and the temperature increase charging mode, and (3) the determination of the next activation time based on the third standby time C3 without executing both temperature increase modes and the temperature increase charging mode (S20 of FIG. 3) is performed at the next activation time $t_{n+1}$. Such preliminary determination is completed, whereby it is possible to progress to the temperature increase or the external charging quickly at the next activation time $t_{n+1}$.

In this way, in a case where the estimation value of the battery temperature by the battery ECU 48 is used in addition to the battery temperature measurement value by the battery temperature sensor 60, the battery ECU 48 is included in the temperature acquirer in addition to the battery temperature sensor 60.

FIG. 7 illustrates a battery temperature increase flow using the estimation value Tb_es of the battery temperature. As in FIG. 3, the temperature increase flow starts with plug-in, at which the charging connector 32 is inserted into the charging plug 30, as a trigger. The charging ECU 50 which is activated from the pause state by plug-in confirms the timer charging setting of the external charging timer 58 (S100). In a case where the timer charging function is set to be off, this flow ends.

In a case where the timer charging function is set to be on, the charging ECU 50 turns on the external charging standby setting (S102). The charging ECU 50 acquires the measurement value Tb of the battery temperature at the time of the activation of the charging controller 64, that is, at the time of plug-in from the battery temperature sensor 60 through the battery ECU 48, and determines whether or not the battery temperature Tb is equal to or lower than the second temperature increase request temperature A2 (S104). In a case where the battery temperature Tb is equal to or lower than the second temperature increase request temperature A2, the second temperature increase mode, the release of the external charging standby setting, and the temperature increase charging mode shown in FIG. 5 are executed.

In a case where the battery temperature Tb becomes higher than the second temperature increase request temperature A2 in Step S104, the charging ECU 50 determines whether or not the battery temperature Tb is equal to or lower than the first temperature increase request temperature A1 (S106). In a case where the battery temperature Tb is equal to or lower than the first temperature increase request temperature A1, the first temperature increase mode, the release of the external charging standby setting, and the temperature increase charging mode shown in FIG. 4 are executed.

In a case where the battery temperature Tb becomes higher than the first temperature increase request temperature A1 in Step S106, the temperature increase to the main battery 10 is not performed, the next activation time $t_{n+1}$ is set. That is, the charging ECU 50 sets the activation time to the timer switch 62 (S108). As the activation time, a time after the third standby time C3 from the current time is set. As in FIG. 3, the third standby time C3 may be equal to, for example, the standby time C1 of the first temperature increase mode (C3=C1).

After the next activation time $t_{n+1}$ is set in the timer switch 62, the battery ECU 48 obtains the estimation value Tb_es ($t_{n+1}$) of the battery temperature at the next activation time $t_{n+1}$ based on Expression (1) described above (S110). Next, the charging ECU 50 determines whether or not the estimation value Tb_es($t_{n+1}$) calculated by the battery ECU 48 becomes equal to or lower than the second temperature increase request temperature A2 (S112). In a case where the estimation value Tb_es($t_{n+1}$) becomes equal to or lower than the second temperature increase request temperature A2, a determination value f is set (S114).

In a case where the estimation value Tb_es($t_{n+1}$) becomes higher than the second temperature increase request temperature A2 in Step S112, the charging ECU 50 determines whether or not the estimation value Tb_es($t_{n+1}$) becomes equal to or lower than the first temperature increase request temperature A1 (S116).

In a case where the estimation value Tb_es($t_{n+1}$) becomes equal to or lower than the first temperature increase request temperature A1 in Step S116, the charging ECU 50 determines whether or not the next activation time $t_{n+1}$ passes the first executable period D1 from the start time (the initial pause period start time, that is, the time at which transition is made to the pause state initially after plug-in) of the timer charging setting period (S118). In a case where the next activation time $t_{n+1}$ has not passed the first executable period D1, a determination value g is set (S120).

In a case where the next activation time $t_{n+1}$ has passed the first executable period D1 from the initial pause period start time and in a case where the estimation value Tb_es($t_{n+1}$) becomes higher than the first temperature increase request temperature A1 in Step S116, a determination value e is set (S122).

After the determination values are respectively set in Steps S114, S120, S122, the charging controller 64 transits to the pause state (S124). If the activation time $t_{n+1}$ is reached, the timer switch 62 activates the charging controller 64 (S126). Electric power during the pause period and at the time of the activation is fed from the sub-battery 22.

The charging ECU 50 determines whether or not the activation time $t_{n+1}$ is a time after elapse of the second executable period D2 from the initial pause period start time (S128). In a case where the activation time $t_{n+1}$ has passed the second executable period D2, the meter ECU 56 transmits a message to the effect of the end of the temperature increase function of the main battery 10 to the terminal of the user through the telematics transceiver 54 (S130). Thereafter, the charging controller 64 transits to the pause state (S132), and the flow ends.

In a case where the activation time $t_{n+1}$ has not passed the second executable period D2 from the initial pause period start time in Step S128, the charging ECU 50 refers to the determination value set at the previous activation time $t_n$ (S134). In a case where the determination value e is set, the process returns to Step S108. In a case where the determination value g is set, the first temperature increase mode, the release of the external charging standby setting, and the temperature increase charging mode shown in FIG. 4 are executed. In a case where the determination value f is set, the second temperature increase mode, the release of the external charging standby setting, and the temperature increase charging mode shown in FIG. 5 are executed. If the flows of the FIGS. 4 and 5 progress, and Step S58 (notification step) is executed, the flow returns to Step S110.

What is claimed is:

1. A battery charging system for an electrically driven vehicle, the battery charging system comprising:
   a charging connector to which a charging plug of an external power supply is connected;
   a charging controller configured to control external charging for charging a battery with the external power supply;
   an external charging timer configured such that an external charging start time is able to be set by a user's operation;

a temperature acquirer configured to acquire a battery temperature; and
a heater configured to increase the battery temperature,
wherein, in a case where the external charging start time is set in the external charging timer when the charging plug is inserted into the charging connector, the charging controller is configured to perform standby setting of the external charging before the external charging start time and transit to a pause state,
the charging controller is configured to be intermittently activated during a timer charging setting period from a pause period start time at which transition is made to the pause state to the external charging start time, and when the battery temperature at a time of activation of the charging controller is equal to or lower than a predetermined temperature, execute a temperature increase mode in which the heater is operated to increase the battery temperature, and
when the temperature increase mode is executed, the charging controller is configured to release the standby setting of the external charging and execute a temperature increase charging mode in which the external charging is performed.

2. The battery charging system for an electrically driven vehicle according to claim 1, further comprising:
a timer switch configured to set an activation time during the timer charging setting period and to activate the charging controller at the activation time,
wherein the charging controller is configured to execute a first temperature increase mode and a second temperature increase mode as the temperature increase mode,
in the first temperature increase mode, in a case where the battery temperature is equal to or lower than a first temperature increase request temperature and higher than a second temperature increase request temperature lower than the first temperature increase request temperature at the activation time of the charging controller, the charging controller is configured to operate the heater to start increasing the battery temperature, reset the activation time after the battery temperature increases to a first temperature increase target temperature, and then, transit to the pause state again,
in the second temperature increase mode, in a case where the battery temperature is equal to or lower than the second temperature increase request temperature at the activation time of the charging controller, the charging controller is configured to operate the heater to start increasing the battery temperature, reset the activation time of the charging controller after the battery temperature increases to a second temperature increase target temperature with a temperature increase width from the second temperature increase request temperature smaller than a temperature increase width from the first temperature increase request temperature to the first temperature increase target temperature, and then, transit to the pause state again, and
the first temperature increase mode is set so as to be executed within a first period from an initial pause period start time, and the second temperature increase mode is set so as to be executed within a second period longer than the first period from the initial pause period start time.

3. The battery charging system for an electrically driven vehicle according to claim 2,
wherein the charging controller is configured to
reset, as the activation time, a time after elapse of a first standby time from a time at which the battery temperature reaches the first temperature increase target temperature when the first temperature increase mode is executed, and
reset, as the activation time, a time after elapse of a second standby time shorter than the first standby time from a time at which the battery temperature reaches the second temperature increase target temperature when the second temperature increase mode is executed.

4. The battery charging system for an electrically driven vehicle according to claim 2,
wherein the charging controller is configured to execute the first temperature increase mode during the first period after the charging plug is inserted into the charging connector, and
when the first period is exceeded, the charging controller is configured to execute the second temperature increase mode.

5. The battery charging system for an electrically driven vehicle according to claim 2,
wherein, in a case where the first period elapses from the initial pause period start time and a case where the battery temperature is higher than the first temperature increase request temperature, the charging controller is configured to inhibit the execution of the temperature increase mode, set a next activation time, and then, bring the external charging into the pause state.

6. The battery charging system for an electrically driven vehicle according to claim 1, further comprising:
a notification unit configured to give notification to the user when the temperature increase charging mode is executed.

7. The battery charging system for an electrically driven vehicle according to claim 1,
wherein the temperature acquirer is configured to acquire the battery temperature when the charging plug is inserted into the charging connector or at the time of the activation of the charging controller.

8. The battery charging system for an electrically driven vehicle according to claim 1,
wherein the temperature acquirer is configured to acquire the battery temperature by estimating a battery temperature at a next activation time based on a battery temperature at a predetermined activation time during the timer charging setting period and a standby time from the predetermined activation time to the next activation time.

9. A battery charging method for an electrically driven vehicle, the battery charging method comprising:
in a case where an external charging start time is set when a charging plug of an external power supply is inserted into an in-vehicle charging connector, performing standby setting of external charging before the external charging start time and transiting an electric control unit that controls the external charging to a pause state;
intermittently activating the electric control unit during a timer charging setting period from a pause period start time at which the electric control unit is transited to the pause state to the external charging start time, and when a temperature of an in-vehicle battery at a time of the start of the external charging is equal to or lower than a predetermined temperature, executing a temperature increase mode in which a heater is operated to increase the temperature of the in-vehicle battery; and
when the temperature increase mode is executed, releasing the standby setting of the external charging and executing a temperature increase charging mode in which the external charging is performed.

* * * * *

UNITED STATES PATENT AND TRADEMARK OFFICE
CERTIFICATE OF CORRECTION

PATENT NO. : 10,179,514 B2
APPLICATION NO. : 15/634653
DATED : January 15, 2019
INVENTOR(S) : Takashi Murata and Yusuke Kuruma Page 1 of 1

It is certified that error appears in the above-identified patent and that said Letters Patent is hereby corrected as shown below:

In the Specification

In Column 14, Line 8, delete "perfoinied" and insert -- performed --, therefor.

Signed and Sealed this
Fifth Day of March, 2019

Andrei Iancu
*Director of the United States Patent and Trademark Office*